Figure 1:
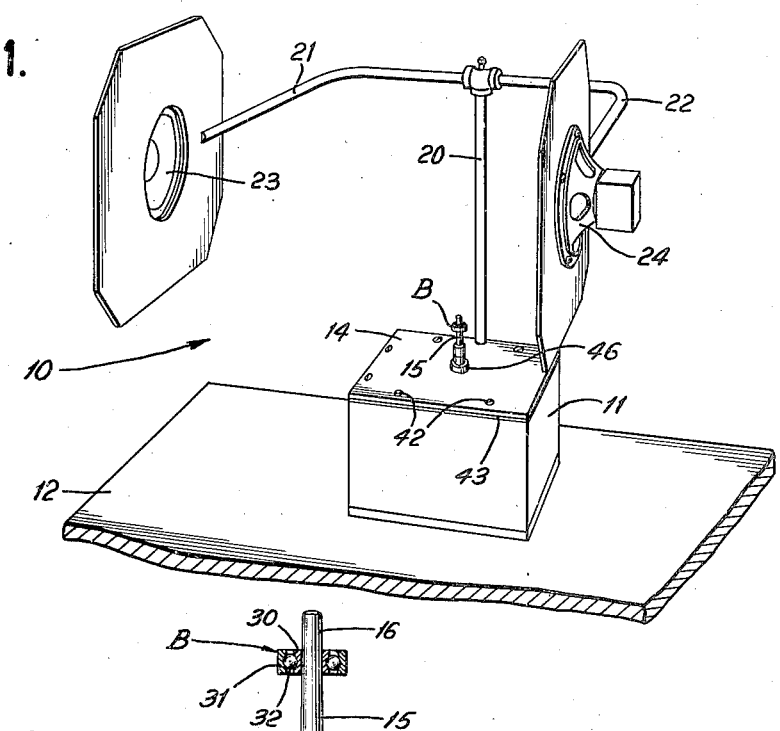

Dec. 5, 1944.   P. W. McCORMACK   2,364,229
BEARING TESTING DEVICE
Filed Aug. 14, 1943

INVENTOR
Paul W. McCormack
BY
ATTORNEY

Patented Dec. 5, 1944

2,364,229

UNITED STATES PATENT OFFICE 2,364,229

BEARING TESTING DEVICE

Paul W. McCormack, Vestal, N. Y., assignor to International Business Machines Corporation, New York, N. Y., a corporation of New York Application August 14, 1943, Serial No. 498,719

4 Claims. (Cl. 73—67)

This invention relates to testing devices and more particularly to devices for testing bearings of the type having rolling contact between the bearing surfaces such, for example, as ball and roller bearings.

An object of the invention is to provide a simple and effective testing device for rolling contact bearings, which is of improved construction and arrangement of parts.

A further object is to provide an improved form of testing device wherein the minute irregularities of the bearing surfaces are transformed into sound audible to the test operator who can readily determine by the noise qualities of a bearing whether it is acceptable or should be rejected.

Other objects of the invention will be pointed out in the following description and claims and illustrated in the accompanying drawing, which discloses, by way of example, the principle of the invention and the best mode, which has been contemplated, of applying that principle.

Figure 2:
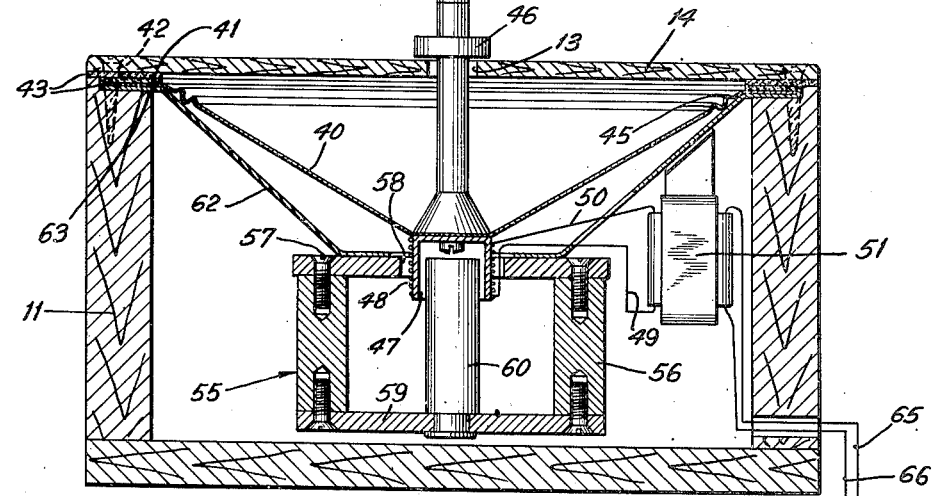
Figure 2:
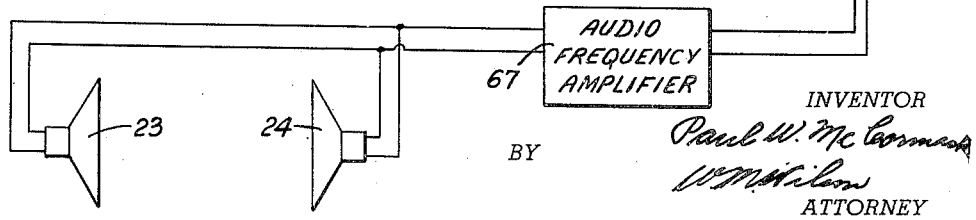

In the drawing:

Figure 1 is a perspective view of a testing device constructed in accordance with the present invention; and Figure 2 is an enlarged transverse vertical section through one part of the bearing testing device shown in Fig. 1, and showing other parts of the testing device in schematic diagram.

Referring now in detail to the construction illustrated, the testing device is indicated in its entirety by the reference character 10 and is shown as comprising generally a box-like housing 11 suitably supported by the flat top 12 of a desk or table and having an opening 13 in the center of its top or cover 14 and through which the upper end of an upright spindle or post 15 is adapted to extend. The upper end of the post 15 is formed as indicated at 16 to receive the bearing to be tested, an example of a bearing to be tested being indicated at B.

The device 10 also comprises upstanding bracket means in the form of a post 20 and a pair of bracket arms 21 and 22, respectively, extending outwardly from opposite sides of the post 20 and then forwardly, and carrying at their forward ends, respectively, a pair of loud speakers 23 and 24 of conventional design. The post 20 and arms 21 and 22 are preferably formed hollow so that they can contain the electrical wires forming the electrical connections to the two speakers. The bracket means for supporting the speakers is such that the speakers are arranged in opposed or facing relation and on opposite sides of the position which is normally occupied by the head of the test operator when testing a bearing. The ears of the operator will thus be located adjacent the two speakers, respectively. The arrangement and location of the speakers provide a direct sound path which is particularly necessary in the case of high frequency sounds.

It will be readily appreciated as the description proceeds that the testing device disclosed herein is readily adaptable for testing a wide variety of bearings wherein the bearing surfaces have rolling contact with one another. The example of bearing indicated at B is readily recognizable as a conventional radial ball bearing including an annular inner race element 30 and an annular outer race element 31 and which are separated by a plurality of spherical anti-friction bodies, or balls 32.

The bearing to be tested is placed on the bearing receiving part 16 of the post 15 with the inner race element 30 centrally mounted against rotation on the part 16 and with the outer race 31 being free to be spun by the test operator; who, as will be readily understood, will use his finger to spin the race 31. The bearing receiving part 16 is preferably formed with a slight upward taper so as to facilitate the placing and removing of the bearings thereon. If desired, the surface of the part 16 may be roughened so as to aid further in preventing the inner race from turning during test. The bearing receiving part 16 is formed detachable from the rest of the post 15 so that different size parts 16 may be provided for different size bearings. It will also be appreciated that in testing bearings other than radial bearings different forms of bearing-receiving parts 16 will have to be used to suit the particular type of bearing to be tested.

The lower end of the post 15 is resiliently supported by an inverted cone-shaped diaphragm 40 (see particularly Fig. 2) which is in turn supported at its upper and outer periphery from the housing 11 by an annular flange 41 formed integral with the diaphragm and firmly held or clamped in position by the cover 14, the latter being fastened to the body of the housing by suitable screws 42. Strips 43 of felt or other suitable material are preferably disposed between the cover 14 and flange 41 and function to prevent the transmission of vibrations from the cover to the diaphragm 40, such as might be caused by an object striking the cover 14. The diaphragm 40 may be formed of any suitable material such, for example, as a paper of the character commonly used for making the cones of loud speakers. In order to assure the resiliency or elasticity of the diaphragm 40 the latter is formed with a plurality of annular corrugations 45.

The lower part of the post 15 is supported by and suitably secured to the center or apex of the diaphragm 40. From the foregoing, it is apparent that when the operator spins the outer race 31 of a bearing, the irregularities in the contact surfaces of the bearing will be transformed into vibratory movements of the post 15, which movements will vary in magnitude and frequency with that of the irregularities. A collar 46 is fastened to the post 15 above the cover 14 and prevents excessive downward pressure on the post from breaking or damaging the diaphragm 40.

Means is provided for converting the above-mentioned vibratory movements of the post into sound which is audible to the test operator and which possess distinctive volume and frequency characteristics varying in accordance with the magnitude and frequency of such movements. To this end, a cylindrical cup shaped member 47 is fixed to and forms a lower extension of the post 15 and is beneath the diaphragm, and a length of wire is wrapped about the cylinder 47 to form a coil 48 terminating in a pair of wires 49 and 50 which are electrically connected through the primary of a matching transformer 51, to form a closed electrical circuit. A permanent magnet 55 is stationarily mounted in the housing 11 and in such a position that its magnetic lines of force pass through the convolutions of the coil 48, and so that movements of the post 15 and the coil 48, which is fixed to the post, will cause the convolutions of the coil to cut the magnetic lines of force and thereby induce an E. M. F. in the circuit which, as just stated, includes the primary of the transformer 51. The induced E. M. F. will, of course, vary in accordance with the magnitude and frequency of the movements of the post 15 and coil 48.

The magnet shown in Fig. 2 comprises a magnetized steel ring 56, a circular plate 57 of soft iron secured by suitable means to the top edge thereof and having an opening 58 in its center, within which the coil 48 on the lower end of the post 15, is suspended. The magnet 55 also comprises a second circular plate 59 of soft iron suitably secured to the bottom edge of the magnetized ring 56, and a soft iron post 60 fixed at its lower end to the central portion of plate 59 and extending upwardly therefrom, as shown. The upper end of the post 60 extends within the cylinder 47 and coil 48 and terminates at the same level as the ring 57. Thus, the magnetic lines of force extend between the upper end of the post 60 and the plate 57 and through the coil 48.

The stationary support for the magnet 55 is provided by an inverted frustro-conical shaped metallic member 62 suitably fixed at its lower end to the top plate 57 of the magnet, and having a peripheral flange 63 formed at its upper outer edge and supported by the body of the housing 11.

As shown, the supporting flange 41 of the diaphragm 40 overlies the flange 63 and both flanges are securely clamped by the cover 14 to the housing 11. The magnet 55, support member 62, diaphragm 40, and post 15 with coil 48, form a removable unit which is held in place within the housing by the cover 14. The transformer 51 is fixed to the member 62 and also forms a part of this removable unit.

The secondary of the transformer 51 is connected by wires 65 and 66 to the input side of an audio frequency amplifier unit which is indicated diagrammatically at 67 in Fig. 2. The loud speakers 23 and 24 are connected in parallel to the output side of the amplifier unit. Thus, the induced E. M. F. in the coil 48 is amplified and converted into sound which has sufficient volume so that it can be easily heard and analyzed by the test operator. The sound emanating from the speakers 23 and 24 possesses distinctive volume and frequency characteristics varying in accordance with the magnitude and frequency of the movements of the post and to similar characteristics of the irregularities in the bearing being tested. Consequently, an operator can readily learn to distinguish between an acceptable bearing and one that should be rejected.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device for testing rolling contact bearings of the type including two race elements separated by anti-friction bodies, the combination of a spindle element having an outer end portion on which each bearing is adapted to be placed for test with one race element centrally mounted against turning on said end portion and with the other race element adapted to be spun by the test operator; means for resiliently supporting said spindle so that when said other race element is spun, irregularities in the contact surfaces of the bearing are converted into vibratory movements of said spindle which movements vary in accordance with the characteristics of such irregularities; a coil of wire fixed to the other end of said spindle and having its ends connected to provide a closed circuit; a magnet stationarily supported so that its magnetic lines of force pass through the convolutions of said coil; means for amplifying the E. M. F. induced in said circuit due to the spinning of the bearings; and means for converting the amplified E. M. F. into sound audible to the test operator.

2. In a device for testing rolling contact bearings of the type including two race elements separated by anti-friction bodies, the combination of a box-like housing having an opening in the top thereof; a post having a lower end disposed within said housing and extending upwardly through said opening and having an upper end portion on which each bearing is adapted to be placed for test with one race element centrally mounted thereon against turning and with the other race element adapted to be spun by the test operator; means within said housing for resiliently supporting said lower end of said post so that when said other race element is spun, irregularities in the contact surfaces of the bearing are converted into vibratory movements of said post, which movements vary in accordance with the magnitude and frequency of such irregularities;

a coil of wire fixed to the lower end of said post and having its ends connected to provide a closed circuit; a magnet stationarily mounted in said housing and positioned so that its magnetic lines of force pass through the convolutions of said coil; and means for converting the E. M. F. induced in said circuit due to the spinning of the bearings into sound audible to the test operator.

3. In a device for testing rolling contact bearings of the type including two race elements separated by anti-friction bodies, the combination of a box-like housing having an opening in the top thereof; a post having a lower end disposed within said housing and extending upwardly through said opening and having an upper end portion on which each bearing is adapted to be placed for test with one race element centrally mounted thereon against turning and with the other race element adapted to be spun by the test operator; means within said housing for resiliently supporting the lower end of said post so that when said other race element is spun, irregularities in the contact surfaces of the bearing are converted into vibratory movements of said post, which movements vary in accordance with the magnitude and frequency of such irregularities; a coil of wire fixed to the lower end of said post and having its ends connected to provide a closed circuit; a magnet stationarily mounted in said housing and positioned so that its magnetic lines of force pass through the convolutions of said coil; and means for converting the E. M. F. induced in said circuit due to the spinning of the bearings into sound audible to the test operator; said converting means including a pair of loud speakers; and bracket means extending upwardly from said housing and supporting said speakers in opposed spaced relation and, on opposite sides of a position normally occupied by the test operator.

4. A unitary device for the hand testing of rolling contact bearings of the type including two race elements separated by anti-friction bodies, and comprising, in combination, a box-like housing; a spindle having an inner end disposed within said housing and extending outwardly of said housing and having an outer end portion on which each bearing is adapted to be placed for testing, with one race element thereof centrally mounted against turning and with the other race element adapted to be manually spun by the operator; means for resiliently supporting said spindle within said housing so that when said other race element is spun, irregularities in the contact surfaces of the bearing are converted into vibratory movements of said spindle, which movements vary in accordance with the characteristics of such irregularities; means within said housing for converting such vibratory movements into electrical energy having an E. M. F. varying in accordance with the characteristics of such movements; means for converting said electrical energy into sound audible to the test operator and having distinctive characteristics varying in accordance with the variations in E. M. F. and including a pair of loud speakers; and bracket means carried by said housing and supporting said loud speakers in opposed spaced relation and on opposite sides of a position which would normally be occupied by the test operator's head while testing the bearings.

PAUL W. McCORMACK.